United States Patent

Pashley

Patent Number: 5,851,500
Date of Patent: Dec. 22, 1998

[54] REMOVAL OF URANIUM CONTAMINATION FROM MAGNESIUM FLUORIDE SLAG

[75] Inventor: John H. Pashley, Oak Ridge, Tenn.

[73] Assignee: United States Enrichment Corporation, Bethesda, Md.

[21] Appl. No.: 916,612

[22] Filed: Aug. 22, 1997

[51] Int. Cl.[6] .............................. C01F 11/22; C01F 5/28
[52] U.S. Cl. ................ 423/178; 423/155; 423/164; 423/490; 423/20; 423/157; 205/46
[58] Field of Search ..................... 423/490, 164, 423/155, 157, 178, 20; 976/DIG. 391, DIG. 394; 205/46

[56] References Cited

U.S. PATENT DOCUMENTS

| | | | |
|---|---|---|---|
| H59 | 5/1986 | Kreuzmann | 423/490 |
| 2,733,126 | 1/1956 | Spiegler | 423/20 |
| 3,341,290 | 9/1967 | Bornemann et al. | 423/164 |
| 3,957,676 | 5/1976 | Cooley et al. | 423/20 |
| 3,961,027 | 6/1976 | Crossley | 423/6 |
| 3,965,238 | 6/1976 | Tabata et al. | 423/8 |
| 4,021,313 | 5/1977 | Hausberger | 205/46 |
| 4,115,219 | 9/1978 | Gancy et al. | 423/164 |
| 4,279,705 | 7/1981 | Riggs, Jr. | 205/46 |
| 4,412,861 | 1/1983 | Kruezmann | 423/20 |
| 4,495,160 | 1/1985 | Moote et al. | 423/164 |
| 4,554,144 | 11/1985 | Ore | 423/158 |
| 4,800,042 | 1/1989 | Kurumada et al. | 423/158 |
| 4,874,599 | 10/1989 | Gay et al. | 423/490 |
| 4,966,710 | 10/1990 | Kim et al. | 423/157 |
| 5,147,616 | 9/1992 | Ackerman et al. | 423/155 |
| 5,409,680 | 4/1995 | Kaczur et al. | 423/164 |
| 5,470,559 | 11/1995 | Grolman et al. | 423/490 |
| 5,516,496 | 5/1996 | Slage | 423/490 |
| 5,613,241 | 3/1997 | Forsberg et al. | 976/DIG. 394 |

FOREIGN PATENT DOCUMENTS 709537  1/1980  Russian Federation.

*Primary Examiner*—Ngoc-Yen Nguyen
*Attorney, Agent, or Firm*—Townsend and Townsend and Crew LLP

[57] ABSTRACT

Magnesium fluoride slag contaminated with metallic uranium or uranium compounds is treated by digestion with potassium hydroxide to soluble potassium fluoride and insoluble magnesium hydroxide. The solid and liquid phases are then separated and the solids phase is dissolved in acid to form a solution of metal salts. The liquid phase is treated with lime to precipitate calcium fluoride and convert the potassium back to potassium hydroxide for recycle to the digestion reaction. The metal salts are separated to remove the uranium salt from the magnesium salt. The result is an efficient removal of uranium contamination from the magnesium, the recovery of magnesium in a manner that permits efficient reuse or safe disposal, and the production of calcium fluoride useful for a variety of purposes.

16 Claims, 1 Drawing Sheet

REMOVAL OF URANIUM CONTAMINATION FROM MAGNESIUM FLUORIDE SLAG

BACKGROUND OF THE INVENTION

1. Field of the Invention

This invention resides in the field of uranium manufacture, and in particular by processes involving the formation of magnesium fluoride slag by-product.

2. Description of the Prior Art

Uranium is extracted from uranium ore by a variety of methods, the selection depending on many factors, prominent among which are the composition and physical form of the ore. The most common methods involve the conversion of uranium oxide to uranium tetrafluoride, the uranium oxide either having been mined as uraninite and pitchblende or having been obtained by the oxidation of other uranium compounds in ores. The uranium tetrafluoride is then converted to uranium metal by magnesiothermic reduction. In the reduction process, the heavier liquid uranium metal collects at the bottom of the reactor, and removal of the uranium from the slag is achieved by cooling the reactor to allow the uranium to solidify to an ingot, then removing the slag from the ingot by mechanical means. For every 100 parts by weight of uranium produced by this process, 53 parts by weight of slag are produced, and the slag is contaminated with uranium in the form of free metal as well as oxides, fluorides and mixed oxides and fluorides. The slag can be disposed of or reused, but its uranium content, which is generally within the range of 2.0% to 4.0% by weight, must be reduced. Current methods involve fine grinding of the slag followed by exhaustive leaching with nitric acid. This is an expensive process and one which itself has difficulty in reducing the uranium content to a level sufficiently low to allow disposal in a low-cost landfill, or to convert the slag to a form that can be used for other purposes.

SUMMARY OF THE INVENTION

It has now been discovered that magnesium fluoride contaminated with uranium, iron, and other metals, particularly those of Group VIII of the Periodic Table and the actinides, can be treated in an efficient manner to reduce these contaminants to levels low enough for nonhazardous disposal and to recover magnesium values in a form permitting their use in other processes. The invention resides in a sequence of processing steps, beginning with treatment of the slag with potassium hydroxide in a metathesis reaction to convert the magnesium to insoluble magnesium hydroxide and to release the fluoride as soluble potassium fluoride. Solid and liquid are then separated and the magnesium hydroxide is dissolved in acid while the potassium fluoride is reacted with lime to precipitate calcium fluoride. The potassium fluoride and lime reaction produces liquid potassium hydroxide which is recycled to the metathesis reaction. The acid-dissolved magnesium is recovered by any of various processes for the separation of magnesium ion from other metal ions in the solution. The process thus separates a mixed waste into three usable components—a purified magnesium salt, purified calcium fluoride, and a concentrated uranium stream—and makes efficient use of potassium. Like the potassium hydroxide produced in the precipitation of calcium fluoride, any magnesium fluoride that did not dissolve in the acid reaction can be recycled back to the metathesis reaction.

These and other features and advantages of the process in each of its various embodiments are explained in further detail below.

BRIEF DESCRIPTION OF THE DRAWING

The single FIGURE is a schematic flow sheet of a process representing one example of the present invention.

DETAILED DESCRIPTION OF THE INVENTION AND PREFERRED EMBODIMENTS

Figure 1:
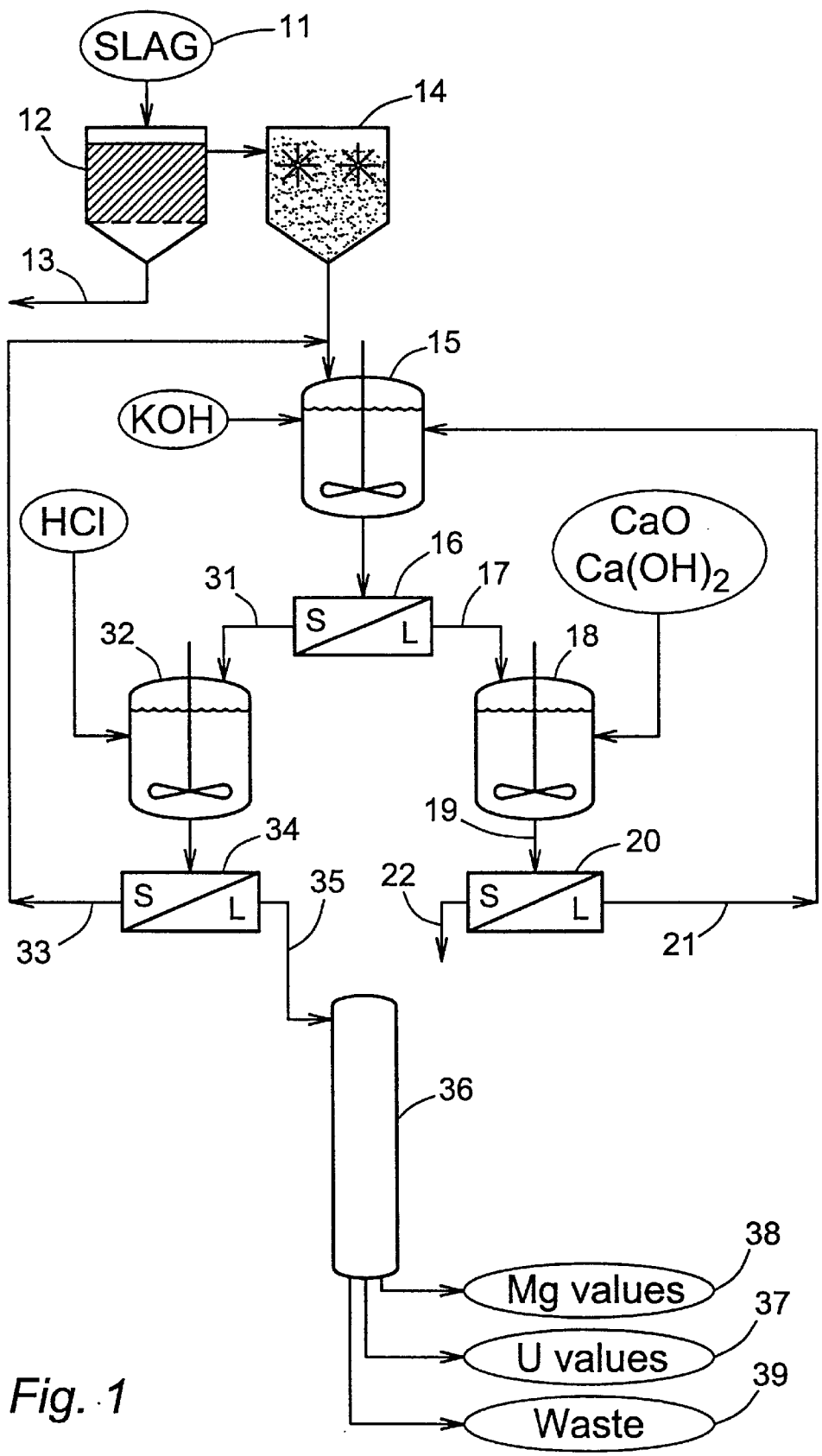

While the invention can be implemented in a variety of ways, the features of the invention can perhaps best be understood by reference to a specific flow scheme as shown in the attached drawing. In the following description, reference is made to the numbered elements in the drawing.

Magnesium fluoride slag that is treatable by the process of this invention will result from the reduction of uranium tetrafluoride with metallic magnesium in a retort, and can vary in composition and form, depending on the conditions in the retort and any intervening steps used to comminute the slag prior to treatment. In general, the slag 11 will contain magnesium fluoride as its major component, together with smaller amounts of free magnesium and uranium metals, and oxides, fluorides, and mixed oxides and fluorides of these metals. The slag is preferably comminuted to particles, and often contains a diluent retained from the magnesiothermic reduction process. Preferably, the diluent is removed 12 prior to performing the steps that constitute the present invention and recycled 13; diluent removal 12 is readily accomplished by conventional means readily apparent to those experienced in slag handling.

While size reduction 14 of the slag is not strictly necessary, it is preferred prior to the treatment of the slag with potassium hydroxide. Size reduction is achievable by conventional means, including wet or dry ball milling, hammer milling, ring-roller milling, jaw crushers, pan crushers, rotary crushers, and the like. The final particle size is not critical to the invention, although the use of smaller particles will produce more efficient results in the chemical treatments that follow. In most applications, a median particle size of about 200 microns or less will provide the best and most economical results.

The metathesis 15 of the magnesium fluoride with potassium hydroxide can be performed under a variety of conditions to achieve the magnesium hydroxide product. The reaction can, for example, be performed in liquid solution, preferably aqueous and non-boiling, or in solid form in a fusion reaction.

When the reaction is performed in a non-boiling aqueous solution, the temperature range is not critical, and the pressure can be adjusted if necessary to suppress boiling. In preferred cases, the temperature will fall within the range of about 5° C. to about 150° C., although improved reaction kinetics can be obtained at temperatures above ambient. At atmospheric pressures, which are generally adequate, the most preferred temperature range is from about 60° C. to about 100° C.

The concentration of potassium hydroxide in the non-boiling aqueous solution is not critical and can vary. In most cases, best results will be obtained with a KOH concentration within the range of about 1 N to about 6 N, and an excess of KOH relative to the magnesium fluoride can be used to beneficial effect. Typical excesses range from about 5% to about 100%, with preferred excesses ranging from about 30% to about 60%. Other factors affecting the rate and completeness of the reaction, in addition to the temperature, KOH concentration, and slag particle size, are the amount of KOH recycle and the degree of agitation in the metathesis reaction vessel. In general, operating conditions will be selected such that the reaction has reached a satisfactory degree of completion (particularly with recycle of unreacted slag, as discussed below) within the range of about one-half hour to about two hours.

The fusion reaction is performed in the solid state at a fusion temperature, preferably within the range of about 350° C. to about 550° C., and most preferably at a nominal temperature of about 500° C. The potassium hydroxide is in the form of dry flakes or particles commonly referred to as walnuts (containing about 10% water by weight). Concentrated aqueous potassium hydroxide (in the region of about 45% by weight) can also be used, although the moisture in either the walnuts or the concentrated solution will be driven off as the temperature rises toward the fusion temperature. For purposes of recycle, however, it may not be convenient to dry the potassium hydroxide all the way to the walnut or flake stage. In any case, a small excess of potassium hydroxide (again relative to the magnesium fluoride), generally less than about 5% by weight, can be used, although the optimal amount will vary with the volume of recycle and the concentration of the recycle stream. Other reaction conditions are likewise not critical—the reaction can be performed effectively at atmospheric pressure, and in atmospheric air. Water is added at the completion of the reaction to dissolve the potassium fluoride and convert the reaction product to a slurry.

Regardless of whether the metathesis 15 is performed as a slurry reaction or as a fusion reaction, the separation 16 of solid from liquid at the completion of the reaction can be achieved by conventional means, such as filtration, or settling and decantation. The liquid phase 17 is then treated 18 with calcium hydroxide, calcium oxide or both to precipitate calcium fluoride, leaving a liquid solution of potassium hydroxide. The amount of calcium hydroxide or calcium oxide is not critical, and can be stoichiometric, less than stoichiometric, or an excess. An excess is preferred.

The precipitated calcium fluoride is then separated 20 from the reaction slurry 19 by conventional means as indicated above, leaving a liquid phase 21 containing dissolved potassium hydroxide that is recycled to the metathesis reaction 15. Depending on whether the metathesis reaction is a slurry reaction or a fusion reaction, it may be desirable to upwardly adjust the concentration of the recycle potassium hydroxide stream. This is readily done by evaporation. The calcium fluoride 22 once separated is useful for a variety of purposes, including the production of hydrofluoric acid and the production of refrigerants, as well as its use in the manufacture and finishing of glass, in ceramics and welding fluxes, and in the extraction and processing of nonferrous metals.

Separately, the solids mixture 31 from the metathesis reaction is dissolved 32 in acid to form soluble salts of the various metals present in the mixture. Any of a variety of acids can be used, including both organic and inorganic acids, although inorganic acids are generally preferred. Specific examples of acids are hydrochloric acid, sulfuric acid, nitric acid and acetic acid. Hydrochloric acid is particularly preferred. The acid concentration is not critical and can vary, although higher concentrations will produce a faster reaction. In general, best results will be obtained with an acid concentration in the range of about 1 N to about 6 N. Other reaction conditions are likewise not critical. Atmospheric pressure is adequate, and the temperature can range from ambient (about 20° C.) to boiling (about 100° C.), although temperatures above ambient, preferably within the range of about 60° C. to about 100° C., will provide a more economic reaction rate.

To dissolve the uranium in acid, best results are achieved when the uranium is present as uranium (VI), i.e., a valence or oxidation state of 6 (in the form of $UO_3$, for example). Any uranium present at a lower valence at any stage in the process prior to the acid treatment can be oxidized by conventional means. Examples are the use of hydrogen peroxide or ions such as ferric or permanganate ions. Alternatively, the valence can be adjusted by electrolytic oxidation. In general, the use of hydrogen peroxide is preferred.

Once the solids are dissolved, any undissolved magnesium fluoride 33 is removed by filtration 34 and recycled to the metathesis reaction 15. In the filtrate 35, the magnesium salts are separated from other metallic salts (notably uranium salts, and iron salts if present) in the solution by any of a variety of methods. One example is anion exchange, which can be performed on a conventional anion exchange resin containing a strong base as the functional group, in a conventional configuration such as a packed column 36. Examples of suitable functional groups are quaternary amines and pyridines. Specific examples are poly-4-vinylpyridine, available from Reilly Chemical Corporation, Indianapolis, Ind., U.S.A., and IONAC A581, available from Sybron Chemicals Inc., Wellford, S.C., U.S.A. An alternative means of separation is selective precipitation, using precipitating agents that will precipitate all but the highly soluble magnesium salt. One example of such a precipitating agent is hydrogen peroxide at a pH in the general vicinity of 2–3. A third alternate means of separation is solvent extraction. An organic solvent that preferentially dissolves the uranium and other metallic salts can used. Examples of organic solvents useful for this purpose are hydrocarbons such as kerosene, alkanes (n-hexane and n-dodecane, for example), and aromatics (for example, SOLVESSO 150, available from Exxon Chemical Company, Houston, Tex., U.S.A.). A preferred extracting agent is an organic solvent containing a phosphate ester, such as tributyl phosphate, at a concentration of about 10% to about 40% by weight. Substituted amines such as dialkyl- and trialkylamines are useful as well, particularly when the aqueous solution contains sulfuric acid. Regardless of the method used, uranium values 37 and magnesium values 38 are recoverable separately from each other, and both are separately recoverable from the remaining impurities 39.

For optimal separation of the uranium salt from the magnesium salt, the uranium is present as uranium (VI), i.e., a valence or oxidation state of 6. Oxidation if necessary can be achieved as indicated above.

The process can be operated as a batch operation or a continuous operation, or a combination wherein one or more stages are performed in a continuous manner while the remainder are performed in batchwise manner. Details of flow sheet and plant design will be readily apparent to those skilled in the art.

In the best mode of this invention as presently contemplated, the metathesis reaction 15 is performed in a non-boiling liquid solution, the precipitation of calcium fluoride 18 is performed with approximately stoichiometric lime, the magnesium hydroxide is dissolved 32 in hydrochloric acid, and the recovery or uranium and the purification of magnesium are achieved by ion exchange 36. Substitutions and variations that are still within the scope of the invention may however be indicated by such factors as the uranium content of the slag, the particular impurities present in the system, and the choice or availability of markets for the by-products.

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

I claim:

1. A method for treating uranium-contaminated magnesium fluoride slag to achieve uranium-free magnesium values, said method comprising:

(a) treating said uranium-contaminated magnesium fluoride slag with potassium hydroxide under conditions selected to produce a solids mixture comprising magnesium hydroxide and uranium-containing solids, and a liquid phase comprising dissolved potassium fluoride;

(b) separating said solids mixture from said liquid phase and treating the liquid phase thus separated with a member selected from the group consisting of calcium hydroxide and calcium oxide to precipitate calcium fluoride and to form a liquid solution of potassium hydroxide;

(c) recycling potassium hydroxide from said liquid solution to step (a); and (d) dissolving said solids mixture produced in step (a) in an acid solution and selectively removing metallic salts other than magnesium salts from said acid solution.

2. A method in accordance with claim 1 in which step (a) comprises treating said uranium-contaminated magnesium fluoride slag with a non-boiling aqueous solution of potassium hydroxide.

3. A method in accordance with claim 2 in which said non-boiling aqueous solution is at a temperature of from about 5° C. to about 150° C.

4. A method in accordance with claim 2 in which said non-boiling aqueous solution is at a temperature of from about 60° C. to about 100° C.

5. A method in accordance with claim 2 in which the concentration of said potassium hydroxide in said non-boiling aqueous solution is from about 1N to about 6N.

6. A method in accordance with claim 1 in which step (a) comprises treating said uranium-contaminated magnesium fluoride slag with solid potassium hydroxide at a temperature in the range of about 350° C. to about 550° C. to form a fusion product, followed by adding water thereto to dissolve potassium fluoride from said fusion product.

7. A method in accordance with claim 1 in which said acid solution of step (d) is an aqueous solution of a member selected from the group consisting of hydrochloric acid, sulfuric acid, nitric acid and acetic acid.

8. A method in accordance with claim 1 in which said acid solution of step (d) is an aqueous solution of an inorganic acid.

9. A method in accordance with claim 1 in which said acid solution of step (d) is an aqueous solution of hydrochloric acid.

10. A method in accordance with claim 1 in which said acid solution of step (d) in which said acid solution is a non-boiling solution at a temperature of from about 20° C. to about 100° C.

11. A method in accordance with claim 1 in which step (d) comprises selectively removing said metallic salts other than magnesium salts by anion exchange.

12. A method in accordance with claim 1 in which step (d) comprises selectively removing said metallic salts other than magnesium salts by selective precipitation.

13. A method in accordance with claim 1 in which step (d) comprises selectively removing said metallic salts other than magnesium salts by solvent extraction.

14. A method in accordance with claim 1 further comprising treating any uranium salts contained in said solids mixture formed in step (a) that contain uranium in a valence state less than 6 to raise the valence to 6, prior to selectively removing said uranium salts in step (d).

15. A method in accordance with claim 14 in which said treatment comprises treatment with hydrogen peroxide.

16. A method in accordance with claim 14 in which said treatment comprises electrolytic oxidation.

* * * * *